O. B. CHEATHAM.
Improvement in Combined Seeder, Plow, and Roller.
No. 122,567. Patented Jan. 9, 1872.
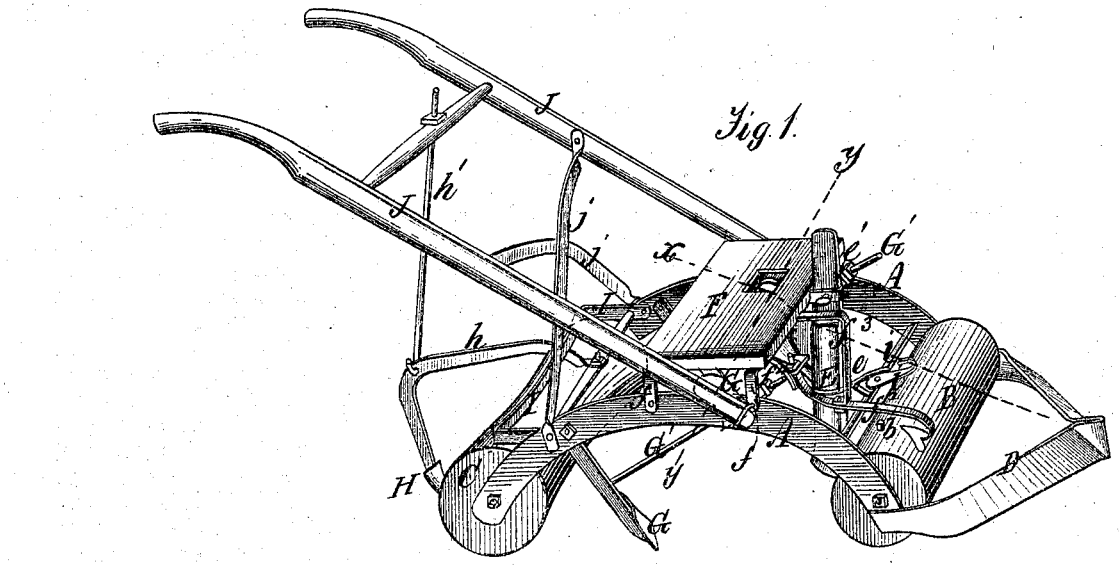
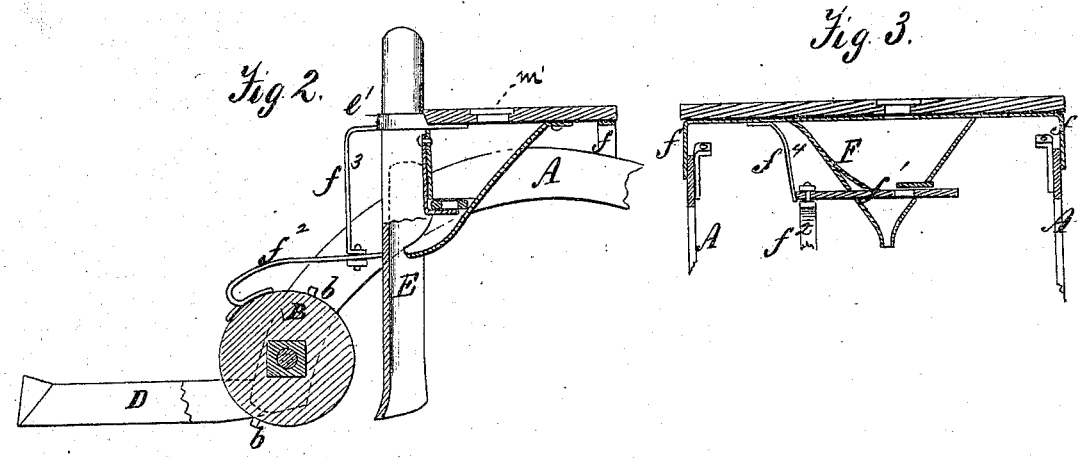

UNITED STATES PATENT OFFICE.

OVERTON B. CHEATHAM, OF HENDERSON, KENTUCKY.

IMPROVEMENT IN COMBINED SEEDERS, PLOWS, AND ROLLERS.

Specification forming part of Letters Patent No. 122,567, dated January 9, 1872.

*To all whom it may concern:*

Be it known that I, OVERTON B. CHEATHAM, of Henderson, in the county of Henderson and State of Kentucky, have invented a new and Improved Combined Seeder, Plow, and Roller; and I do hereby declare that the following is a full, clear, and exact description thereof, which will enable others skilled in the art to make and use the same, reference being had to the accompanying drawing forming part of this specification, in which Figure 1 represents a perspective view, showing my invention. Fig. 2 is a longitudinal section through dotted lines $t\,t$, of Fig. 1, and Fig. 3 is a transverse section through dotted lines $y\,y$ of Fig. 1.

My invention has for its object to furnish a machine simple in construction, effective and reliable in its operation; and it consists in the combination and arrangement of the parts hereinafter described, and more fully pointed out by the claims.

In the drawing, A A represent two arched or curved bars to the forward ends of which is journaled the roller B, and to the rear ends of said bars is journaled the roller C. The roller B serves a twofold purpose—first, to roll the ground before the seed is dropped; and, secondly, to actuate the seed-slide. The roller C is concave, as shown in Fig. 1, and serves to press the earth over the seed, and leave the ground in ridges where the seed are dropped. D is a fender attached to the outside front ends of bars A A, its purpose being to throw the stubble or other obstructions to either side of the machine, and, if desired, it may be made adjustable upon the bars A A by perforations and bolts. E refers to a tube or seed-spout which is held in place by a loop, $e$, attached to a brace or rod connecting the bars A A, and by staple $e^1$ entering the top of the seed-tube and having a set-screw, $e^3$, by which the said tube may be held in place when elevated. F indicates the seed-hopper, the top of which is provided with an opening, $m'$, the hopper being secured to the bars A A by bars or braces $f\,f$. $f^1$ refers to the seed-slide which passes through an opening in the bottom of the seed-box, and is operated by lever $f^2$, said lever being pivoted to pendant $f^3$. The lever is curved on its forward end, and it has a triangular point, which, as the roller B revolves, comes in contact with the stud or pin $b$, by which motion is imparted to the seed-slide $f^1$, which is thrown in an opposite direction by the spring $f^4$. G G indicate two plows, the standards of which being secured to the bars A A, as shown in Fig. 1, and braced by rods G' G', said rods being furnished with screw-threads and passing through staples so that the plows may be adjusted at any desired angle. The plows may be rendered vertically adjustable, if desired, by perforating the standards at the top to which they are secured. H indicates a shovel-plow, the standard $h$ of which is of an angular form and extends over the roller C, and secured to the scraper-brace. The plow H is for making a furrow for the seed when the machine is used in preparing cotton and vegetable beds, and can be readily removed when not in use. I refers to a scraper, the lower edge of which is made of a form to correspond to the roller C. This scraper may be adjusted, as desired, by the rod $h'$ passing through the brace between the handles. Its operation will be readily understood by reference to Fig. 1, of the drawing. J J indicate handles, which are of an ordinary form and secured to the bars A A, and held in place by the diagonal braces $j\,j$. $i$ indicates a hook attached to the cross-bar $i$, to which the whiffletree is attached.

Having thus described my improved machine, what I claim, and desire to secure by Letters Patent, is—

1. The curved bars A A, in combination with the fender D, roller B, plows G G, and concave roller C, arranged substantially as and for the purpose set forth.

2. The seed-tube and drill-opener E, in combination with the hopper F, slide $f^1$, loops $e\,e^1$, and set-screw $e^2$, as and for the purpose described.

3. The bars A A, provided with the concave roller C, and handles J J, and scraper-brace adapted to receive the plow H, and rod $h'$, as and for the purpose set forth.

In testimony whereof I have hereunto signed my name this 19th day of October, A. D. 1871, in presence of two subscribing witnesses.

OVERTON B. CHEATHAM.

Witnesses:
FRANCIS E. WALKER,
C. BAILEY.